(12) United States Patent  
Boock

(10) Patent No.: US 7,997,384 B2
(45) Date of Patent: Aug. 16, 2011

(54) MULTILAYER BOARD FOR REDUCING SOLID-BORNE SOUND

(75) Inventor: Klaus Boock, Timmdorf (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 12/599,878

(22) PCT Filed: May 7, 2008

(86) PCT No.: PCT/EP2008/055645
§ 371 (c)(1),
(2), (4) Date: Nov. 30, 2009

(87) PCT Pub. No.: WO2008/138840
PCT Pub. Date: Nov. 20, 2008

(65) Prior Publication Data
US 2010/0140013 A1 Jun. 10, 2010

Related U.S. Application Data

(60) Provisional application No. 60/930,440, filed on May 15, 2007.

(30) Foreign Application Priority Data

May 15, 2007 (DE) .......... 10 2007 022 616

(51) Int. Cl.
*B32B 3/00* (2006.01)
*B32B 3/28* (2006.01)
*E04B 1/82* (2006.01)
*F16F 7/00* (2006.01)

(52) U.S. Cl. ........ 181/293; 181/207; 181/284; 181/286; 181/288; 181/290; 428/167; 428/172

(58) Field of Classification Search ............... 181/293, 181/207, 284, 286, 288, 290; 428/167
See application file for complete search history.

(56) References Cited

U.S. PATENT DOCUMENTS

| | | | | | |
|---|---|---|---|---|---|
| 2,348,703 | A | * | 5/1944 | Weir et al. | 428/121 |
| 2,413,568 | A | * | 12/1946 | Hurley | 181/291 |
| 2,485,648 | A | * | 10/1949 | Norquist | 29/469.5 |
| 2,674,015 | A | * | 4/1954 | Mautner | 428/167 |
| 2,731,374 | A | * | 1/1956 | De Reus | 428/169 |
| 2,994,112 | A | * | 8/1961 | Stephens | 52/506.09 |
| 3,070,851 | A | * | 1/1963 | Stephens | 52/506.09 |
| 3,087,570 | A | * | 4/1963 | Kurtze et al. | 181/208 |
| 3,295,133 | A | * | 12/1966 | Emerson et al. | 342/4 |
| 3,555,131 | A | * | 1/1971 | Weismann | 264/46.7 |
| 4,113,053 | A | * | 9/1978 | Matsumoto et al. | 181/284 |

(Continued)

FOREIGN PATENT DOCUMENTS

CA 2075579 A1 2/1993

(Continued)

*Primary Examiner* — Elvin G Enad
*Assistant Examiner* — Christina Russell
(74) *Attorney, Agent, or Firm* — Lerner, David, Littenberg, Krumholz & Mentlik, LLP

(57) ABSTRACT

A multilayer board for reducing solid-borne sound radiation with improved mechanical stability when subjected to a load, comprising a first cover layer, a second cover layer, and at least one core layer, wherein the at least one core layer is arranged between the first and the second cover layer, and wherein the at least one core layer comprises at least one first sloped slot.

13 Claims, 4 Drawing Sheets

U.S. PATENT DOCUMENTS

Figure 1:
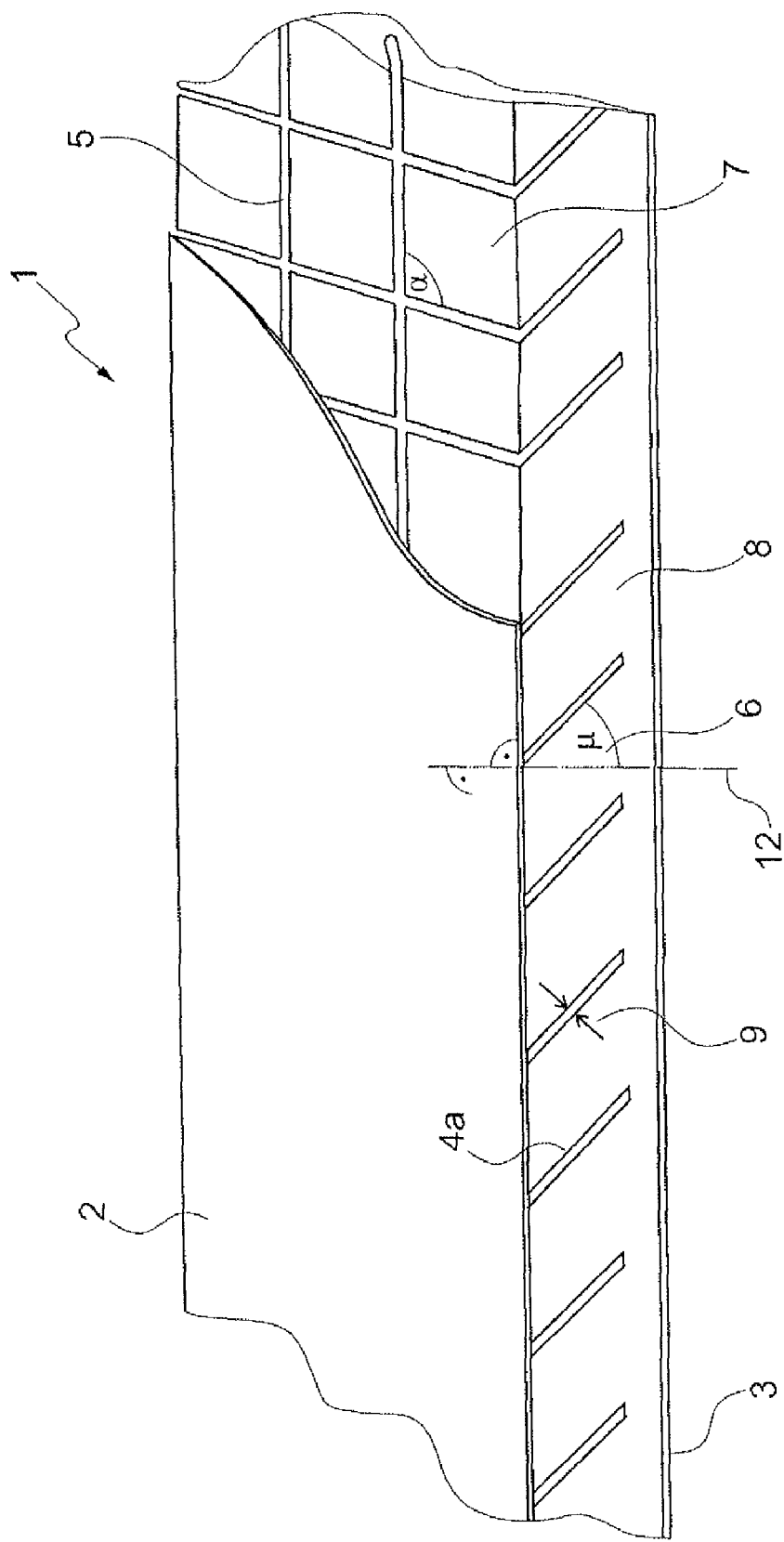

| | | | | |
|---|---|---|---|---|
| 4,353,433 | A | * | 10/1982 | Mohrenstein-Ertel et al. .................. 181/207 |
| 4,555,433 | A | * | 11/1985 | Jablonka et al. ............. 428/166 |
| 5,509,247 | A | * | 4/1996 | Fortez et al. .................... 52/630 |
| 5,664,397 | A | * | 9/1997 | Holz .................... 52/794.1 |
| 6,213,252 | B1 | * | 4/2001 | Ducharme ................... 181/293 |
| 6,615,951 | B1 | * | 9/2003 | Boutin et al. ................ 181/293 |
| 6,815,044 | B2 | * | 11/2004 | Boock .......................... 428/172 |
| 2004/0058131 | A1 | * | 3/2004 | Boock .......................... 428/167 |
| 2004/0069564 | A1 | * | 4/2004 | Wang et al. .................. 181/293 |
| 2005/0103568 | A1 | * | 5/2005 | Sapoval et al. .............. 181/293 |
| 2007/0292658 | A1 | * | 12/2007 | Thomas et al. .............. 428/116 |
| 2009/0307996 | A1 | * | 12/2009 | Berger ........................... 52/144 |

FOREIGN PATENT DOCUMENTS

| | | | |
|---|---|---|---|
| CA | 2609510 | A1 | 12/2006 |
| DE | 1422020 | A1 | 11/1969 |
| DE | 4126781 | A1 | 2/1993 |
| DE | 19509972 | A1 | 9/1996 |
| DE | 10034990 | A1 * | 2/2002 |
| DE | 10231791 | C1 | 12/2003 |
| DE | 102004026644 | A1 | 3/2005 |
| DE | 9408118 | U | 9/2005 |
| DE | 102005024549 | B3 | 12/2006 |
| JP | 2005090090 | A * | 4/2005 |
| WO | 8504922 | A1 | 11/1985 |
| WO | 9220523 | A1 | 11/1992 |
| WO | 2007048149 | A1 | 5/2007 |

\* cited by examiner

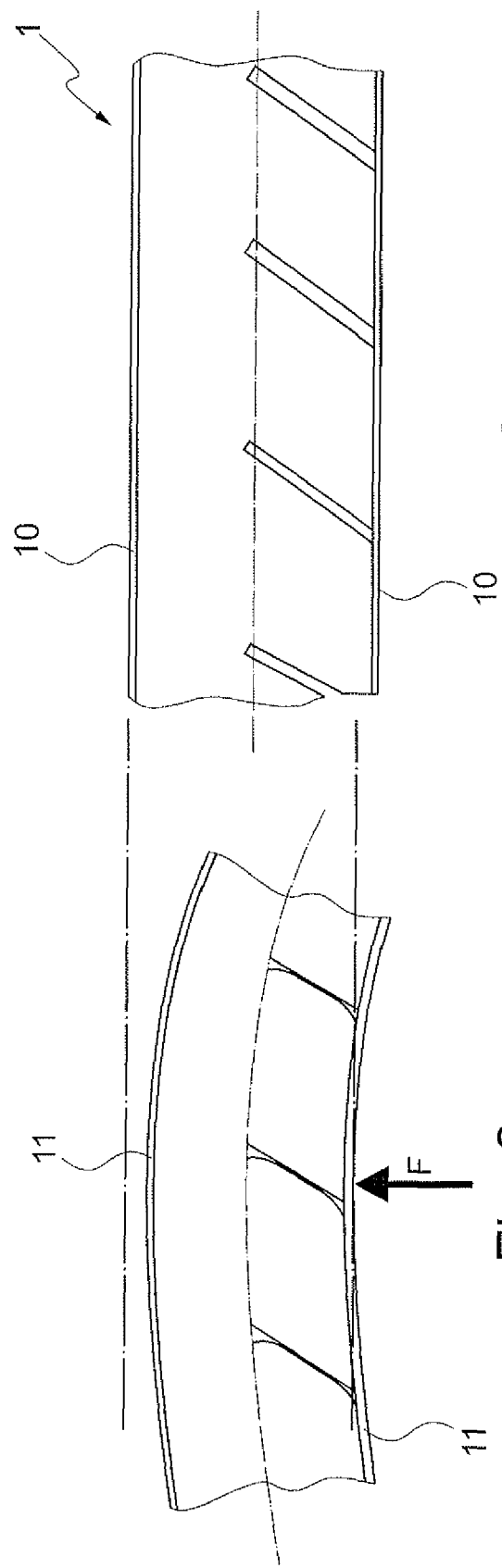

MULTILAYER BOARD FOR REDUCING SOLID-BORNE SOUND

CROSS-REFERENCE TO RELATED APPLICATIONS

This application is a national phase entry under 35 U.S.C. §371 of International Application No. PCT/EP2008/055645, filed May 7, 2008, published in English, which claims the benefit of the filing date of German Patent Application No. 10 2007 022 612.2 filed May 15, 2007 and of U.S. Provisional Patent Application No. 60/930,440 filed May 15, 2007, the disclosures of which applications are hereby incorporated herein by reference.

FIELD OF THE INVENTION

The present invention relates to a multilayer board, a means of transport comprising at least one multilayer board according to the invention, and the use of a multilayer board according to the invention in a means of transport.

TECHNOLOGICAL BACKGROUND OF THE INVENTION

In conventional multilayer boards for reducing solid-borne sound the main design aim has been as effective as possible a reduction in sound radiation, as can be found, for example, in DE 100 34 990 B4. Said printed publication discloses the design of a multilayer board that essentially comprises three layers, wherein the middle layer is slotted roughly in a cross-shape. However, as a result of the relatively large slots, it may be possible that there is not only a reduction in solid-borne sound radiation but also in the mechanical stability when subjected to a load.

SUMMARY OF THE INVENTION

It may be desirable to have a multilayer board for reducing solid-borne sound radiation, which multilayer board provides improved mechanical stability when subjected to a load.

According to an exemplary embodiment of the present invention, a multilayer board for reducing solid-borne sound radiation is created, which multilayer board provides improved mechanical stability when subjected to a load, wherein the multilayer board comprises a first cover layer, a second cover layer and at least one core layer, wherein the at least one core layer is arranged between the first and the second cover layer, and wherein the at least one core layer comprises at least one first sloped slot.

In the context of the present patent application the following definitions are used:

Slot: The term "slot" refers to any elongated or essentially area-shaped recess in a material, in the present context in particular in the core layer of the multilayer board, wherein the slot preferably extends from a surface into the material. In this arrangement the slot can be made with the use of various processing methods, for example, but not exhaustively, by sawing, filing, milling, drilling, etching and the like. The hollow space created in this manner may be left as such or it may be filled with a material, e.g. a foam, plastic or some other Sloped slot: The term "sloped slot" refers to a slot, in particular arranged in a core layer of a multilayer board, which slot in relation to the normal on the surface on which the slot is formed does not extend parallel but instead at an angle into the core layer, and furthermore at least in sections extends in one of the principal directions of extension of the core layer. Thus an angle $\mu$ forms between the normal on the surface of the core layer and the direction of transverse extension of the sloped slot, which angle $\mu$ differs from 0°.

Direction of longitudinal extension: In its idealised two-dimensional extension the slot or sloped slot according to the invention comprises essentially two different principal directions of extension. In this arrangement that principal direction of extension which extends so as to be essentially parallel to the surface of core layer(s) or to the first and/or second cover layer is designated the direction of longitudinal extension. For example in the case of a curved or partly linear course of the sloped slot, this direction of longitudinal extension may be defined also only in sections or by way of the tangent of the curvature at a given point of the sloped slot.

Direction of transverse extension: In the context of the present invention the direction of transverse extension is regarded as the second principal direction of extension. The direction of transverse extension extends into the thickness of the core layer at an angle to the surface normal of the core layer. In the case, for example, of a curved or partly linear course of the sloped slot, the direction of transverse extension, too, may only be defined in sections or by way of the tangent of the curvature at a given point of the sloped slot. In this arrangement, the direction of longitudinal extension and the direction of transverse extension may be aligned so as to be perpendicular in relation to each other.

The present invention describes multilayer boards as they may among other things be used in aircraft construction for interior paneling of the passenger cabin. In this application, apart from the aesthetic, visual aspect, the aspects of sound absorption and reduced solid-borne sound radiation may also play a significant role. The multilayer board according to the invention may thus, for example, be used as paneling on the inside of the covering or as a kind of space divider that is arranged so as to be essentially perpendicular to the longitudinal axis of the aircraft (e.g. between different seating categories, or to partition-off galleys, rest areas, sanitary installations etc.). In the former application the multilayer board according to the invention may, among other things, suppress sound propagation in the cabin as a result of reflection on the partition walls, or may acoustically separate the lines, for example air lines and pneumatic lines, that are situated behind the paneling, i.e. between the aircraft envelope and the multilayer board, from the passenger cabin, and also from air that enters the aircraft envelope from the outside.

Below, the acoustic behaviour of multilayer boards is briefly set out.

Accordingly, in the low frequency range the occurrence of lateral flexural waves is observed whose speed is determined by the overall flexural strength of the multilayer board. As the frequency increases, the flexural wave starts to slowly make a transition to a lateral shear wave, whose propagation speed increases proportionally to the root of the core-layer shear modulus, irrespective of the frequency. At still higher frequencies the lateral shear wave then makes a transition to a lateral flexural wave, whose propagation speed is determined by the flexural strength of the cover layers of the multilayer board. If there were a possibility, in this situation, to be able to select the shear modulus of the core layer in a suitable manner, it may be possible to achieve a situation in which the lateral waves in the entire frequency range of interest remain below the speed of sound in air. By corresponding manipulation of the parameters of cover layer thickness, core layer thickness, cover layer-E-module, and density of the cover layers and the core layer, a situation can be achieved wherein the multilayer board has an advantageous acoustic behaviour. At the same time the flexural strength of the multilayer board considered may be kept sufficiently high in the non-loaded state.

Thus, in order to obtain a multilayer board that is advantageously designed from an acoustic point of view, corresponding measures may have to be provided which in view of the above considerations aim to reduce the core-layer shear rigidity of the multilayer board according to the invention, which core-layer shear rigidity is physically directly proportional to the core-layer shear modulus. The reduction in this core-layer shear rigidity may be achieved by a suitable slot arrangement of the core layer of the multilayer board according to the invention.

However, known slot arrangements of the core layer of the multilayer board may be at the same time associated with a reduction in mechanical stability. Since corresponding multilayer boards are essentially placed in the passenger cabin of an aircraft, and are thus subjected to direct contact with passengers, a corresponding exposure to loads is a frequently-occurring case. This ranges from passengers simply supporting themselves when leaving the passenger seat or resting against said multilayer boards when they are tired during a flight. However, in extreme cases corresponding multilayer boards also have to withstand brief but possibly very violent impact loads, at times restricted to small areas, for example if a passenger falls against a corresponding multilayer board, or if a service trolley that is more or less out of control crashes against said multilayer board. In a conventional design of a multilayer board it is possible, by way of slots that in a targeted manner have been introduced into the core layer for improving the acoustic characteristics, for a corresponding force to cause extensive deformation which to a very considerable extent subjects the individual components of the multilayer board to tensile/shear stress.

By designing the multilayer board according to the invention with relatively small sloped slots, a design may be achieved which on the one hand provides an acoustically favourable design, and on the other hand, when subjected to external force, permits only little deformation and associated tensile/shear stress or shear forces. This may be achieved by means of a sloped-slot design in which the sloped slots when subjected to forces essentially close up immediately, with the result being an essentially compact coherent or continuous core layer with a behaviour that is similar to a solid non-slotted core layer.

Multilayer boards according to the invention may be made from a plurality of suitable materials, e.g. plastic, metal or fibre-reinforced materials comprising carbon-, glass- or aramide fibres. The individual components of the multilayer board may comprise different or identical materials. In this process the selection of materials takes place taking into account the inventive idea. In this context, foams are materials, which may be particularly advantageous.

Further exemplary embodiments are stated in the dependent claims.

Furthermore, embodiments of the multilayer board according to the invention are described. However, these explanations apply both to the means of transport comprising at least one multilayer board, and to the use of a multilayer board in a means of transport.

According to an exemplary embodiment of the present invention, the at least one first sloped slot on a first side of the at least one core layer may be open, and on the second side, which is arranged opposite this first side it may be not open. In this context the term "open" refers to reaching through the surface or the material. The second side, which is opposite said first side, may be not open, i.e. designed so that it does not reach through the material. In this way the slot design may in a simple manner be incorporated in the material of the core layer without reducing or exceeding the stability or structural integrity of the core layer to such an extent that simple handling or installation of the processed/prepared core layer is no longer possible. However, a design may also be imaginable in which the first sloped slot reaches through the surface on both sides. In this case the stability or the integrity may be ensured by at least one of the cover layers.

According to another exemplary embodiment of the present invention, the at least one core layer furthermore may comprise at least one second sloped slot, wherein the at least one first sloped slot and the at least one second sloped slot within the surface with their respective direction of longitudinal extension parallel to the surface of the at least one core layer may comprise an angle $\alpha$.

According to another exemplary embodiment of the present invention, the angle $\alpha$ may essentially be 90°. Consequently, the direction of longitudinal extension of the at least one first sloped slot and the at least one second sloped slot may be arranged so as to be essentially perpendicular to each other, thus essentially forming a rectangular pattern. However, any other angles are of course also imaginable, e.g. 45°, 30°, 60°, 22.5°, 67.5°. In principle any angle ranging between 0 and 90° may be possible, wherein for the sake of simplicity always an acute enclosed angle is considered. However, it may also be possible for the direction of longitudinal extension of the sloped slots to locally change relative to the surface of the core layer, without the enclosed angle $\alpha$ changing. This may result in an even change in the directions from the first and second sloped slots, without however there being a change $\alpha$ of the angle enclosed by the respective local directions.

According to another exemplary embodiment of the present invention, the angle $\alpha$ may dynamically change with the course of the at least one first sloped slot and the at least one second sloped slot. As described above, the respective directions of longitudinal extension of the first and second sloped slots relative to the core layer may change with the course of the sloped slots. In this arrangement these changes may also be independent of each other so that this results in a dynamic change in the respective local angle $\alpha$.

According to another exemplary embodiment of the present invention, the first sloped slot may be a sloped slot selected from the group comprising a single sloped slot, double sloped slot, multiple sloped slot, fan-shaped sloped slot and a Y-shaped sloped slot. In this arrangement this geometric design may remain the same over the entire length of the slot or it may change in sections and/or intervals. Sectional transitions, so-called morphing-transitions, between two geometric embodiments may also be imaginable.

According to another exemplary embodiment of the present invention, the multilayer board may comprise a multitude of core layers. In this way still further-reaching design options may result. The materials of the individual core layers may be the same or they may differ from each other. The slot design and/or its principal directions of extension may be the same or they may differ. It may also be possible to design and arrange the respective sloped slots of the individual core layers such that an advantageous transition according to the invention is formed between them. In this arrangement the slots may overlap entirely or in part and may, at least in some regions, be arranged so that their openings point away from each other (in other words in each case two openings followed by two non-openings facing each other).

According to another exemplary embodiment of the present invention, the connection between the cover layer and the core layer, as well as the connection between two core layers, may at least in some regions be designed as a connection from the group comprising an adhesive connection, solder connection, weld connection, press connection and a mixture of the aforementioned.

According to another exemplary embodiment of the present invention, a sloped slot may be designed such that when an external force acts on the multilayer board, the at least one sloped slot is essentially being closed from a particular limiting force onward. In this arrangement the sloped slots may be dimensioned such that in the case of point-shaped or large-area force that acts temporarily or over an extended period of time, said sloped slots close as a result of mechanical deformation or bending of the multilayer board. In this way a compact and essentially continuous core layer and thus a multilayer board may be created again. Smaller, non-closed slot regions, for example in the region of attachment of the core layer to a cover layer, can be disregarded in this context. The success according to the invention, of the present invention, may nevertheless be realised in this arrangement. In this arrangement, corresponding closing-off may take place quasi directly, in other words without extensive deformation of the multilayer board.

According to another exemplary embodiment of the present invention, a means of transport may comprise at least one multilayer board. In this arrangement, the term "means of transport" may refer to any vehicle that conveys either persons or goods either commercially or non-commercially. This includes buses, rail vehicles, motor vehicles, ships and boats, and in particular also aircraft.

According to another exemplary embodiment of the present invention, a multilayer board according to the invention may be used in a means of transport.

Below, exemplary embodiments of the invention, which are, however, not to be interpreted as limiting, are shown in the following figures and are explained in more detail.

SHORT DESCRIPTION OF THE DRAWINGS

The following are shown:

FIG. 1 a perspective view of a multilayer board according to an exemplary embodiment of the invention, comprising a slot design as a simple sloped slot.

Figure 2:
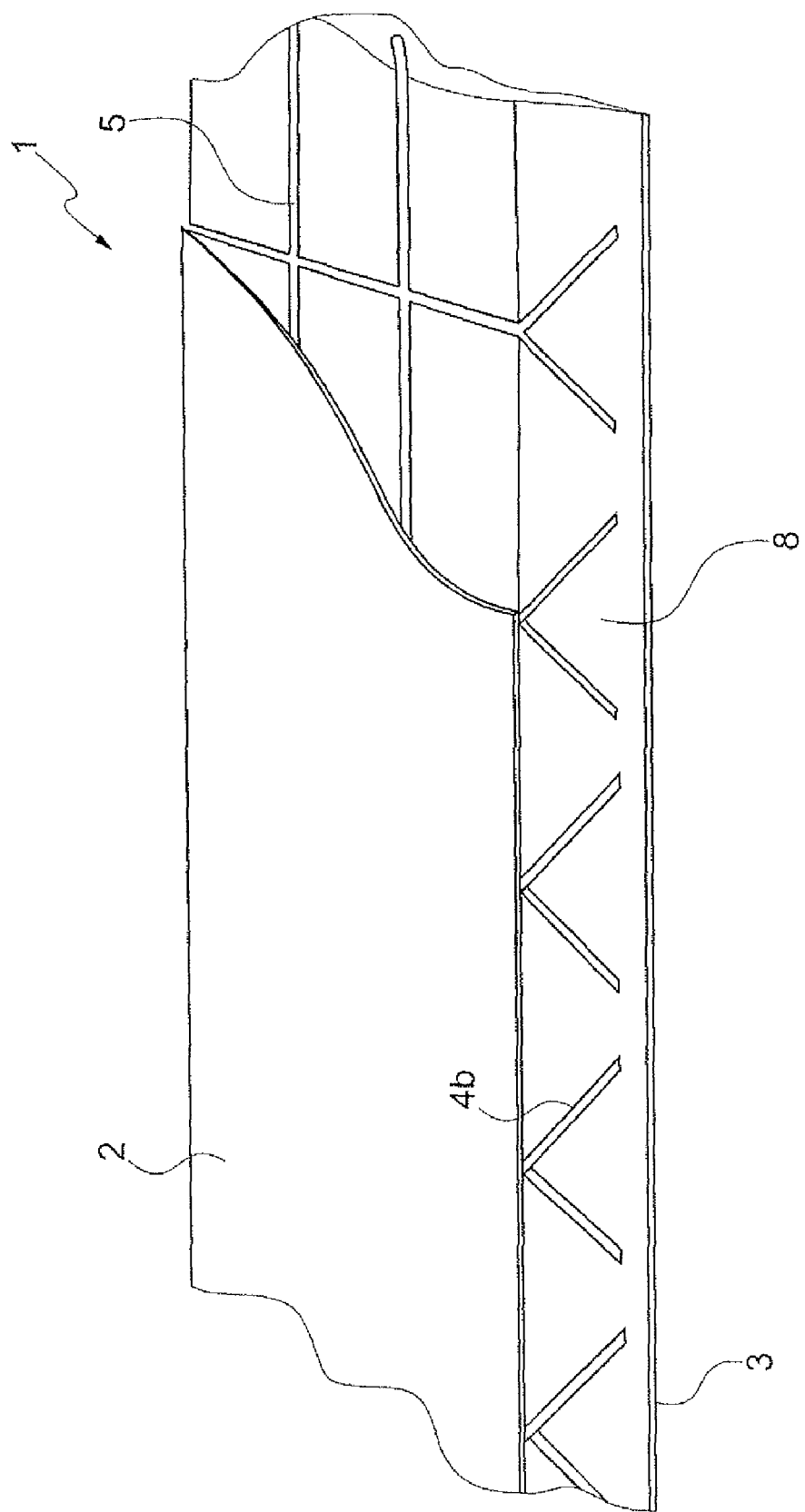

FIG. 2 a perspective view of a multilayer board according to another exemplary embodiment of the invention, comprising a slot design as a double sloped slot.

FIG. 3a,b section views of a multilayer board according to another exemplary embodiment of the invention in a deformed state when subjected to external loads, and in a non-deformed state.

FIG. 4a-e profile sections of various sloped-slot designs.

DETAILED DESCRIPTION OF EXEMPLARY EMBODIMENTS

Identical or similar components in different figures have the same reference characters.

The illustrations in the figures are diagrammatic and not to scale, but they may indicate qualitative size relationships.

FIG. 1 shows a perspective view of an exemplary embodiment of a multilayer board 1 according to the invention, comprising a design of the sloped slot as a single sloped slot 4a,5. In this arrangement the multilayer board 1 comprises a core layer 8 that is arranged between the first cover layer 2 and the second cover layer 3. The surface normal 12 of the multilayer board 1 and thus also for the first cover layer 2, second cover layer 3 and core layer 8 is shown, characterised and further clarified by the two right angles on the surface of the multilayer board 1, in the example shown on the first cover layer 2. The alignment of the direction of transverse extension of the first sloped slot 4a is arranged in relation to the surface normal 12 at an angle $\mu$. The directions of longitudinal extension of the first sloped slot 4a and the second sloped slot 5 encompass the angle $\alpha$ 7. Said angle can be as desired; for the sake of simplicity, in FIG. 1 it is essentially 90°. The direction of transverse extension of the second sloped slot 5 also runs at an angle relative to the surface normal 12, except that in the embodiment shown the angle is not defined in detail. It is of course not mandatory for the angles of the transverse direction of design of the first sloped slot 4a and the second sloped slot 5 be identical. In this arrangement the dimensions of the sloped slots in longitudinal direction and in transverse direction essentially depend on the design of the core layer 8 and furthermore also on the entire multilayer board 1. The thickness 9 of the sloped slot, in the diagram shown only in relation to the first sloped slot 4a, needs to be selected according to the desired or required mechanical load bearing capacity or deformation, and depending on the materials. Typical thicknesses 9 of the sloped slots are, without any limiting interpretation, in the range from below 1 mm, particularly preferred, depending on the board thickness, below 0.5 mm or even essentially below 0.5 mm. By means of such a design of the sloped slot it is then possible with the multilayer board 1 according to the invention to absorb external forces without having to take into account any far-reaching deformation of the multilayer board 1 and tensile/shear stress loads that occur as a result. Thus the load of the respective cover layer in the transition region is also reduced, and sagging or collapsing of the cover layer 2, in the embodiment shown the first cover layer, is effectively prevented. When subjected to external loads, if a particular limiting force $F_g$ is exceeded, the slot is closed essentially at once, i.e. immediately. In this manner the limiting force $F_g$ can be determined by means of the dimensions and design of the multilayer board, and can be matched to the given requirements.

FIG. 2 shows a perspective view of a multilayer board 1 according to another exemplary embodiment of the invention, comprising a slot design of the first sloped slot 4b as a double sloped slot. The second sloped slot 5 is shown unchanged, but it may also comprise the same or an entirely different slot design. In principle, any desired combination of designs of sloped slots, as shown below in FIGS. 4a to 4e, is imaginable. By means of a corresponding design of the first sloped slot 4b as a double sloped slot, changed deformation under load is achieved. This in turn may make changed dimensioning possible.

FIG. 3a shows a section view of a multilayer panel 1 according to another exemplary embodiment of the invention, subjected to external load by the force F in the deformed state with closed sloped slots. In comparison, FIG. 3b shows the same multilayer board in its non-deformed state with open slots. Preferably it should be assumed that the side comprising the open sloped slots is the side onto which the force acts.

Figure 4A:
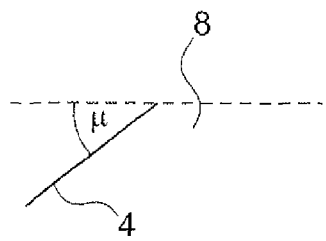
Figure 4B:
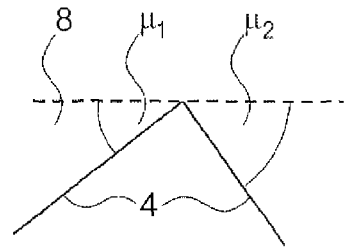
Figure 4C:
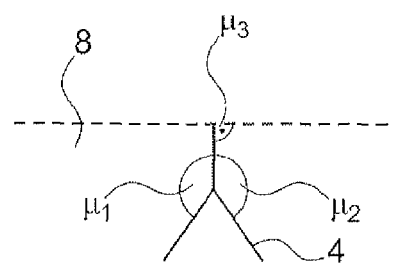
Figure 4D:
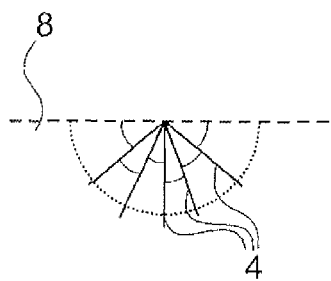
Figure 4E:
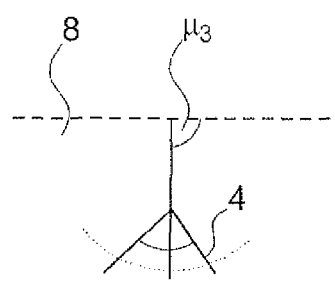

FIGS. 4a-e show profile sections comprising various designs of sloped slots. For example, FIG. 4a shows a single sloped slot; FIG. 4b a double sloped slot; FIG. 4c a Y-shaped sloped slot; FIG. 4d a multiple sloped slot; and FIG. 4e a fan-shaped sloped slot. In the case of several angles, e.g. $\mu_1$ and $\mu_2$, in one figure, these angles are not necessarily identical but they can have the same value. Further embodiments are possible, taking into account the scope and nature of the invention.

According to another exemplary embodiment of the present invention, the angle α may dynamically change with the course of first sloped slot 4a and second sloped slot 4b. As described above, the respective directions of longitudinal extension of the first and second sloped slots relative to the core layer may change with the course of the sloped slots. In this arrangement these changes may also be independent of each other so that this results in a dynamic change in the respective local angle α.

Implementation of the invention is not limited to the above described exemplary embodiments shown in the figures. Instead, a multitude of variants are possible which use the solution shown and the basic idea according to the invention even in the case of fundamentally different embodiments.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

1 Multilayer board
2 First cover layer
3 Second cover layer
4a,b First sloped slot
5 Second sloped slot
6 Angle μ
7 Angle α
8 Core layer
9 Thickness of the sloped slot
10 Position of the cover layer before bending
11 Position of the cover layer after bending
12 Surface normal
F External force

The invention claimed is:

1. A multilayer board for reducing solid-borne sound radiation with improved mechanical stability when subjected to a load, the multilayer board comprising:
a first cover layer,
a second cover layer, and
at least one core layer, wherein
the at least one core layer is arranged between the first cover layer and the second cover layer, and wherein
the at least one core layer comprises at least one first sloped slot;
wherein the at least one first sloped slot is designed such that when an external force acting on the multilayer board exceeds a particular threshold force, the at least one first sloped slot is substantially closed.

2. The multilayer board of claim 1, wherein
the at least one core layer further comprises at least one second sloped slot, and wherein
respective longitudinal directions of the at least one first sloped slot and the at least one second sloped slot at a surface of the at least one core layer are angled with respect to each other at an angle α.

3. The multilayer board of claim 2, wherein the angle α is 90°.

4. The multilayer board of claim 2, wherein the angle α changes with the course of the at least one first sloped slot and the at least one second sloped slot.

5. The multilayer board of claim 2, wherein
the at least one second sloped slot is designed such that when an external force acting on the multilayer board exceeds a particular threshold force, the at least one second sloped slot is substantially closed.

6. The multilayer board of claim 1, wherein
the connection between the first or second cover layer and the core layer is at least in some regions designed as a connection selected from the group consisting of an adhesive connection, a solder connection, a weld connection, a press connection, and a mixture thereof.

7. The multilayer board of claim 6,
comprising a multitude of core layers, wherein the connection between two of the core layers is at least in some regions designed as a connection selected from the group consisting of an adhesive connection, a solder connection, a weld connection, a press connection, and a mixture thereof.

8. The multilayer board of claim 1, wherein
the first sloped slot is selected from the group consisting of a single sloped slot, a double sloped slot, a multiple sloped slot, a fan-shaped sloped slot, and a Y-shaped sloped slot.

9. The multilayer board of claim 1, comprising a multitude of core layers.

10. A means of transport comprising at least one multilayer board of claim 1.

11. The multilayer board of claim 1, wherein the at least one core layer further comprises a first side and a second side opposite the first side, the at least one first sloped slot being open on the first side and not open on the second side.

12. A method comprising:
using a multilayer board in a means of transport, the multilayer board comprising
a first cover layer,
a second cover layer, and
at least one core layer, wherein
the at least one core layer is arranged between the first cover layer and the second cover layer, wherein
the at least one core layer comprises at least one first sloped slot; and wherein
the at least one first sloped slot is designed such that when an external force acting on the multilayer board exceeds a particular threshold force, the at least one first sloped slot is substantially closed.

13. A multilayer board for reducing solid-borne sound radiation with improved mechanical stability when subjected to a load, the multilayer board comprising:
a first cover layer,
a second cover layer, and
at least one core layer, wherein
the at least one core layer is arranged between the first cover layer and the second cover layer, wherein
the at least one core layer comprises at least one first sloped slot; wherein
the at least one core layer further comprises at least one second sloped slot, wherein
respective longitudinal directions of the at least one first sloped slot and the at least one second sloped slot at a surface of the at least one core layer are angled with respect to each other at an angle α; and wherein
the angle α dynamically changes along the course of the at least one first sloped slot and the at least one second sloped slot.

* * * * *

UNITED STATES PATENT AND TRADEMARK OFFICE
CERTIFICATE OF CORRECTION

| | | |
|---|---|---|
| PATENT NO. | : 7,997,384 B2 | Page 1 of 1 |
| APPLICATION NO. | : 12/599878 | |
| DATED | : August 16, 2011 | |
| INVENTOR(S) | : Klaus Boock | |

It is certified that error appears in the above-identified patent and that said Letters Patent is hereby corrected as shown below:

In the Specification

Column 1, Line 62 insert --material.-- after the word other.

Signed and Sealed this
Twenty-first Day of October, 2014

Michelle K. Lee
*Deputy Director of the United States Patent and Trademark Office*